United States Patent
James et al.

(10) Patent No.: US 8,935,430 B2
(45) Date of Patent: Jan. 13, 2015

(54) SECONDARY SERVICE UPDATES INTO DNS SYSTEM

(75) Inventors: S. Daniel James, South Riding, VA (US); Scott Stewart, Reston, VA (US); Ravinder Bhalla, Ashburn, VA (US); Arunabho Das, Fairfax, VA (US); David Blacka, Reston, VA (US)

(73) Assignee: Verisign, Inc., Reston, VA (US)

( * ) Notice: Subject to any disclaimer, the term of this patent is extended or adjusted under 35 U.S.C. 154(b) by 96 days.

(21) Appl. No.: 13/538,202

(22) Filed: Jun. 29, 2012

(65) Prior Publication Data

US 2014/0006641 A1 Jan. 2, 2014

(51) Int. Cl.
*G06F 15/16* (2006.01)
*G06F 15/177* (2006.01)

(52) U.S. Cl.
USPC ........... 709/245; 709/201; 709/202; 709/203; 709/220; 709/221

(58) Field of Classification Search
CPC ............ H04L 41/0803; H04L 41/0813; H04L 41/085; H04L 41/0866; H04L 41/0893; H04L 29/12301; H04L 61/2076; H04L 61/1552; H04L 29/12066; H04L 61/1511; G06F 17/30864
USPC ......... 709/213, 215, 217, 238, 201, 202, 203, 709/220, 221, 222, 245
See application file for complete search history.

(56) References Cited

U.S. PATENT DOCUMENTS

| 5,958,052 | A   |   | 9/1999  | Bellovin et al. |         |
|-----------|-----|---|---------|-----------------|---------|
| 6,411,966 | B1  | * | 6/2002  | Kwan et al.     | 1/1     |
| 6,701,329 | B1  | * | 3/2004  | Esibov et al.   | 1/1     |
| 6,769,031 | B1  |   | 7/2004  | Bero            |         |
| 6,895,431 | B1  |   | 5/2005  | Bero            |         |
| 7,149,736 | B2  |   | 12/2006 | Chkodrov et al. |         |
| 7,464,136 | B2  |   | 12/2008 | Lemson et al.   |         |
| 7,565,402 | B2  | * | 7/2009  | Schneider       | 709/203 |
| 7,680,876 | B1  | * | 3/2010  | Cioli et al.    | 709/201 |

(Continued)

FOREIGN PATENT DOCUMENTS

| CN | 101834875 A      | 9/2010  |
|----|------------------|---------|
| CN | 101883078 A      | 11/2010 |
| WO | WO 2011/091646 A1 | 8/2011 |

OTHER PUBLICATIONS

Partial European Search Report dated Oct. 7, 2013 from European Patent Application No. 13174356.9 filed Jun. 28, 2013, pp. 1-4.

(Continued)

*Primary Examiner* — Edward Kim
(74) *Attorney, Agent, or Firm* — MH2 Technology Law Group, LLP

(57) ABSTRACT

Systems and methods for instantaneously updating a DNS system database containing DNS records using partitions and atomic switching are disclosed. In one or more implementations, the system may include clients, a network, and a DNS system. Clients may communicate with the DNS system using the network in order to provide DNS record updates to a DNS system database. The DNS system includes distributed denial of service ("DDOS") protection proxies, a firewall, and zone relays, allowing clients to specify which name servers are authorized to communicate with the DNS system. The DNS system also supports bulk updates of DNS records without causing clients to experience a reduction in performance, by writing DNS records to a hard disk and simultaneously saving the DNS records to the database in batches.

7 Claims, 7 Drawing Sheets

(56) References Cited

U.S. PATENT DOCUMENTS

| | | |
|---|---|---|
| 7,680,956 B2 * | 3/2010 | Volz et al. .................... 709/245 |
| 7,865,617 B1 * | 1/2011 | Pulleyn et al. ................ 709/245 |
| 7,904,345 B2 | 3/2011 | Dworkin et al. |
| 2004/0039798 A1 * | 2/2004 | Hotz et al. .................... 709/219 |
| 2005/0089048 A1 * | 4/2005 | Chittenden et al. ...... 370/395.54 |
| 2005/0144323 A1 | 6/2005 | Gardos et al. |
| 2005/0182781 A1 | 8/2005 | Bouvet |
| 2007/0165542 A1 | 7/2007 | Shin et al. |
| 2008/0005127 A1 * | 1/2008 | Schneider ...................... 707/10 |
| 2009/0113075 A1 | 4/2009 | Migault |
| 2011/0060950 A1 * | 3/2011 | Waldron et al. ................ 714/48 |
| 2011/0113020 A1 * | 5/2011 | Pulleyn et al. ................ 707/696 |
| 2012/0017259 A1 | 1/2012 | MacCarthaigh |
| 2012/0072407 A1 * | 3/2012 | Shyamsunder et al. ...... 707/709 |

OTHER PUBLICATIONS

Extended European Search Report dated Jan. 2, 2014 from European Patent Application No. 13174356.9 filed Jun. 28, 2013, pp. 1-11.

Author Unknown. DNS Best Practices, Netvvork Protections, and Attack Identification. Cisco Systems, Jun. 17, 2012, pp. 1-12.

Ohta, M., "Incremental Zone Transfer in DNS;" Tokyo Institute of Technology, Aug. 1, 1996, pp. 1-9.

Goodknecht Sr., Kevin D., "DNS Import/Export Functionality," *PC Review*, http://www.pcreview.co.uk/forums/dns-import-export-functionality-t1475731.html, Feb. 11, 2005 (3 pages).

"SolutionBase: Managing Application Directory Partitions in Active Directory," http://www.techrepublic.com/article/solutionbase-managing-application-directory-partitions-in-active-directory/5746279, Jun. 22, 2005 (5 pages).

* cited by examiner

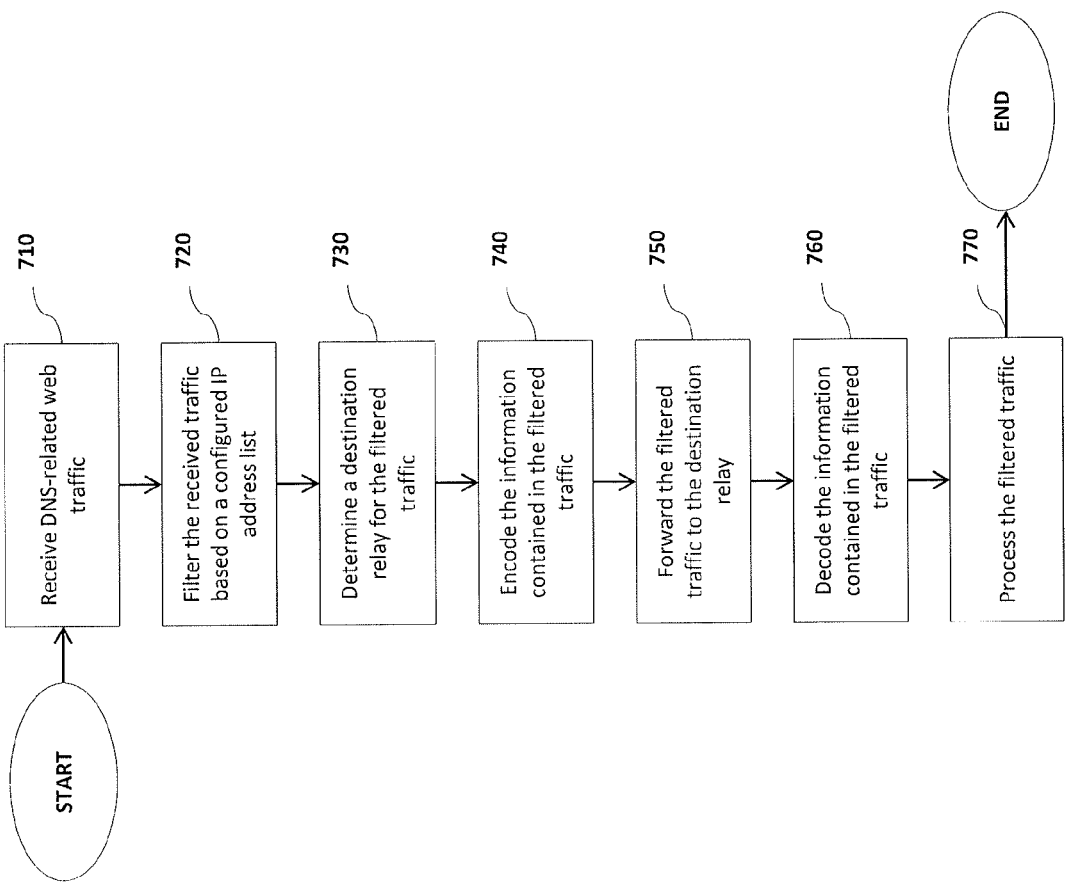

SECONDARY SERVICE UPDATES INTO DNS SYSTEM

FIELD

The present disclosure relates generally to various methods for improving the performance of a domain name server ("DNS") system, including through the use of partitions and atomic switching.

BACKGROUND

A client computer can use a network, such as the Internet, to communicate with and identify other computers connected to the network. The client computer identifies a unique Internet Protocol ("IP") address for each of these other computers. The client computer may know the IP address of a computer, or it may need to determine this IP address from a domain name using the Domain Name System (DNS).

DNS allows people using the Internet to refer to domain names, rather than IP addresses, when accessing websites and other online services. Domain names, which employ text characters, such as letters, numbers, and hyphens (e.g., "www.example.com"), will often be easier to remember than IP addresses, which are numerical and do not contain letters or hyphens (e.g., "128.1.0.0"). In addition, a domain name may be registered before an IP address has been acquired. The DNS is the Internet's hierarchical lookup service for mapping the character-based domain names meaningful to humans into the numerical IP addresses used by internet devices.

Top-level domain (TLD) servers are responsible for maintaining zone information (usually second-level domains) and for answering the queries directed to registered domains. For example, Verisign, Inc. operates the generic top-level domains (gTLDs) for .com and .net.

The process of establishing a web site on the internet typically begins with a registrant registering a specific domain name through a registrar. The registrant may be an individual or organization that identifies a domain name, such as "example.com." The registrant contacts a registrar to process the name registration, who in turn sends the necessary domain name service information to a registry. Once the registry receives the domain name service information from the registrar, it inserts that information into a centralized database and propagates the information on the internet so that users around the world may find the domain names. The registry also provides information back to the registrar after this process is complete.

Clients of DNS systems may attempt to initiate large-scale updates of domain name service information. Such large-scale updates, however, have the potential to disrupt DNS service due to the vast amount of information that the DNS system must process. Thus, a need exists for a high-volume, high-speed approach for processing domain name service information able to effectively accommodate such large-scale updates without disruption to, or perceived sluggishness by, the client.

SUMMARY

Systems and methods for instantaneously updating a DNS system database using partitions and atomic switching are described, consistent with disclosed embodiments. In one embodiment, database entries may be generated based on the receipt of DNS records. One such database entry may include a flag indicating whether a partition corresponding to the received DNS records is in use. In another embodiment, a database entry may include a flag indicating whether a partition corresponding to the received DNS records is active. A new partition may be created in a database, and the received DNS records may be stored in the new partition. A specific flag may be toggled, indicating that the new partition corresponding to the received DNS records is active.

In another embodiment, systems and methods for storing records received from a client to a hard disk and simultaneously saving the records into a database in batches are described, consistent with disclosed embodiments. For example, DNS records received from a client may be stored in a memory while additional DNS records continue to be received. The DNS records may be transferred in batches from the memory to a hard disk, and the information associated with each DNS record may be written to a file. Preexisting information for each received DNS record stored in a database may be written to a separate file, and the two files may be compared to determine which DNS records in the database need to be updated.

In yet another embodiment, systems and methods for using a transparent proxy that filters DNS-related web traffic received by the DNS system are described, consistent with disclosed embodiments. In response to receiving DNS-related web traffic, such as a network packet, the received traffic may be filtered based on a user-configured IP address list. Acceptable traffic may be encoded and forwarded to a destination relay, which may then decode the forwarded traffic before performing further processing. Use of the transparent proxy and filter offers improved protection for a DNS system against distributed denial of service ("DDOS") attacks.

It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain the principles of the application.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 7 is a flow diagram illustrating exemplary processes for using a transparent proxy that filters DNS-related web traffic received by the DNS system, consistent with disclosed embodiments.

DESCRIPTION OF THE EMBODIMENTS

Reference will now be made in detail to exemplary embodiments, examples of which are illustrated in the accompanying drawings. Wherever convenient, the same reference numbers will be used throughout the drawings to refer to the same or similar parts.

Figure 1:
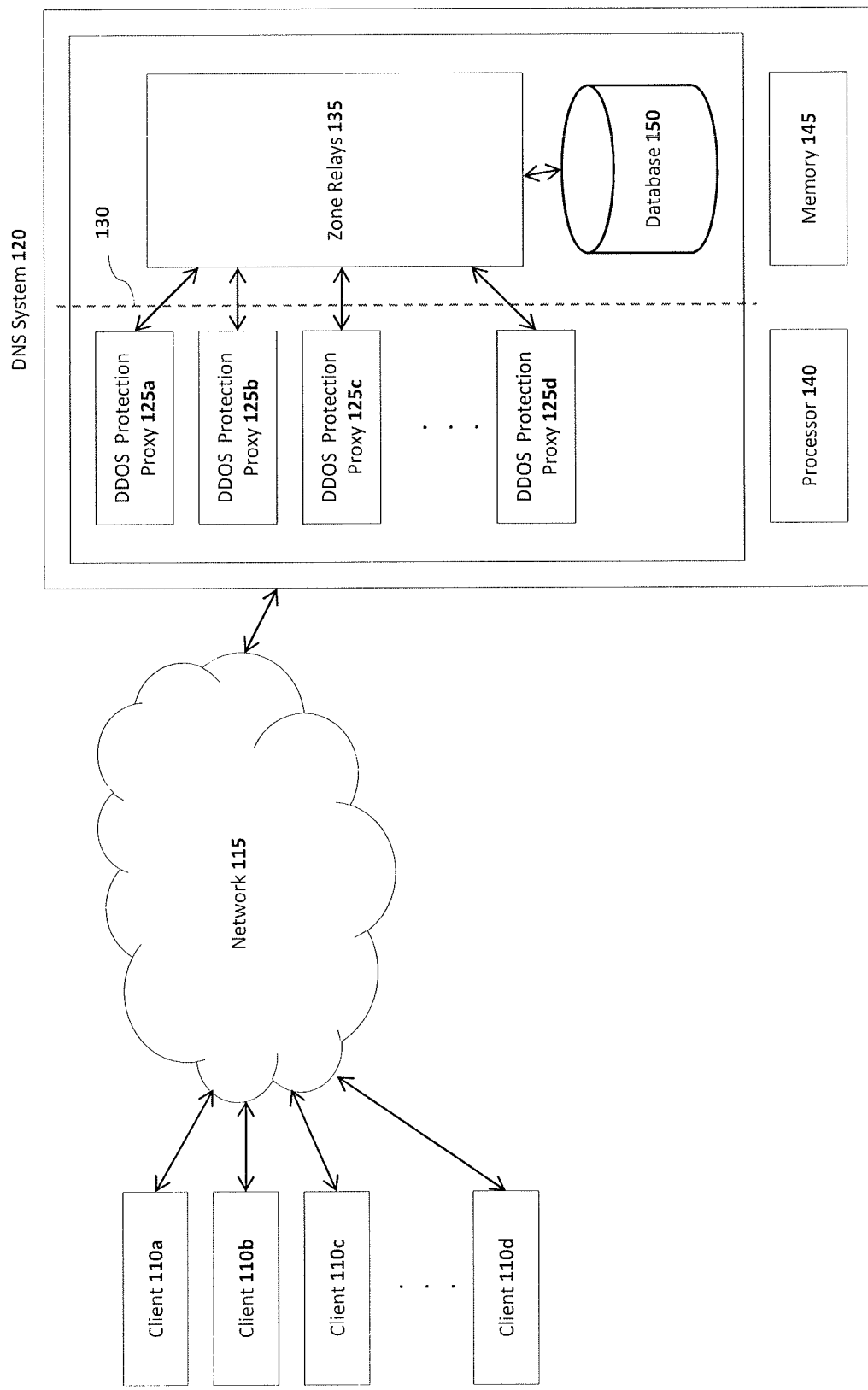
FIG. 1 is a diagram illustrating an exemplary DNS system capable of implementing disclosed embodiments, including exemplary system components.

FIG. 1 is a diagram illustrating an exemplary DNS system 120 that may be used to implement disclosed embodiments, including exemplary system components. The components and arrangement, however, may be varied. DNS system 120 may include DDOS ("distributed denial-of-service") protection proxies 125a-125d (collectively "DDOS protection proxies 125"), firewall 130, one or more zone relays 135, processor 140, memory 145, and database 150. DNS system 120 may be a general purpose computer, a server, a mainframe computer, or any combination of these components. In some embodiments, DNS system 120 may include a cluster of computing systems capable of performing distributed data analysis, e.g., using Google's MapReduce™ framework.

Clients 110a-d (collectively "clients 110") may each include one or more of general purpose computers, servers, or any devices capable of communicating over a network. Network 115 may include the Internet, a local area network ("LAN"), or other network that is a portion of a larger network or system of networks (e.g., an enterprise network). DDOS protection proxies 125 may each include one or more virtual machines. The functionality provided by the DDOS protection proxies 125 may be implemented within a Linux kernel. Firewall 130 may be placed in between DDOS protection proxies 125, and zone relays 135 and database 150. Zone relays 135 may be implemented using application-level software. Zone relays 135 may also be programmed using the Java™ programming language. Database 150 may contain DNS records. For example, database 150 may include zone files, zone names, and resource records. Database 150 may be implemented using partitions.

Processor 140 may include one or more known processing devices, such as a microprocessor from the Pentium™ or Xeon™ family manufactured by Intel™, the Turion™ family manufactured by AMD™, or any of various processors manufactured by Sun Microsystems. Memory 145 may include one or more storage devices configured to store information used by processor 140 to perform certain functions related to disclosed embodiments. In certain embodiments, memory 145 may include instructions that, when executed by DNS system 120, perform various procedures, operations, or processes consistent with disclosed embodiments.

Methods, systems, and articles of manufacture consistent with disclosed embodiments are not limited to separate programs or computers configured to perform dedicated tasks. Processor 140, for example, may execute one or more programs located remotely from DNS system 120. For example, DNS system 120 may access one or more remote programs that, when executed, perform functions related to disclosed embodiments.

Memory 140 may be also be configured with an operating system (not shown) that performs several functions well known in the art when executed by DNS system 120. By way of example, the operating system may be Microsoft Windows™, Unix™, Linux™, Solaris™, or some other operating system. The choice of operating system, and even to the use of an operating system, is not critical to any embodiment.

DNS system 120 may include one or more I/O devices (not shown) that allow data to be received and/or transmitted by DNS system 120. I/O devices may also include one or more digital and/or analog communication input/output devices that allow DNS system 120 to communicate directly with programmers or with other machines and devices. In other embodiments, programmers may provide requests and receive information through the I/O devices of system 120. DNS system 120 may receive data from external machines and devices and output data to external machines and devices via I/O devices. The configuration and number of input and/or output devices incorporated in I/O devices may vary as appropriate for certain embodiments.

Figure 2:
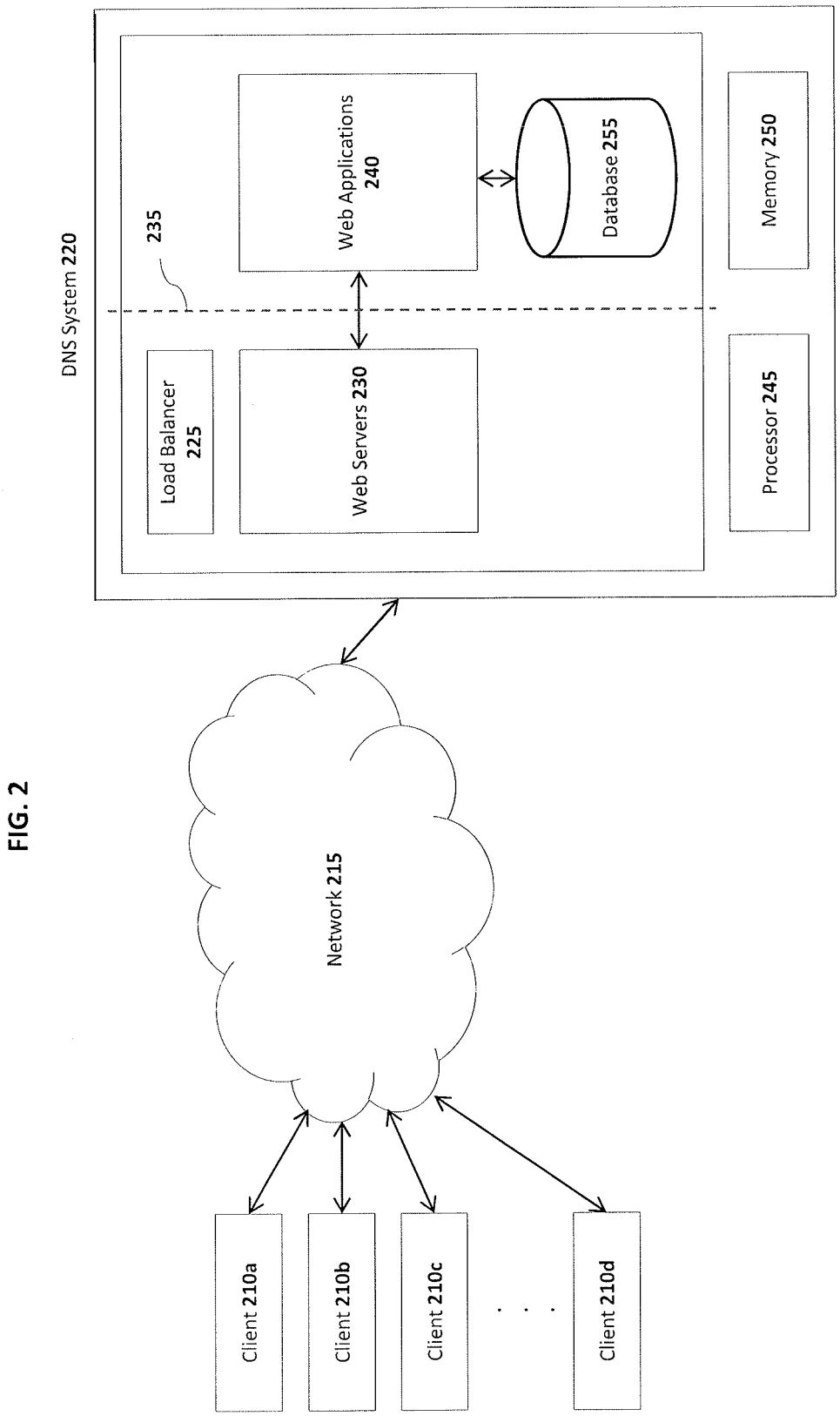
FIG. 2 is a diagram illustrating an exemplary DNS system capable of implementing disclosed embodiments, including exemplary system components.

FIG. 2 is a diagram illustrating an exemplary DNS system capable of implementing disclosed embodiments, including exemplary system components. The exemplary DNS system 220 described in connection with FIG. 2 may include similar system components as the exemplary DNS system 120 described in connection with FIG. 1. For example, DNS system 220 may include processor 245, memory 250, and database 255, each of which may be substantially similar to processor 140, memory 145, and database 150 described in connection with FIG. 1, above.

In contrast to exemplary DNS system 120 described in connection with FIG. 1, DNS system 220 may include a load balancer 225. Load balancer 225 may be an Apache HTTP server configured as a proxy. Consistent with disclosed embodiments, load balancer 225 may communicate with web servers 230. Web servers 230 may provide an interface for web applications 240 over a firewall 235. DNS system 220 may enable Clients 210a-d (collectively "clients 210") to communicate with DNS system 220 over a network 215 in order to update DNS records stored in database 255. DNS system 220 may provide web applications 240 in order for clients 210 to update DNS records.

Figure 3:
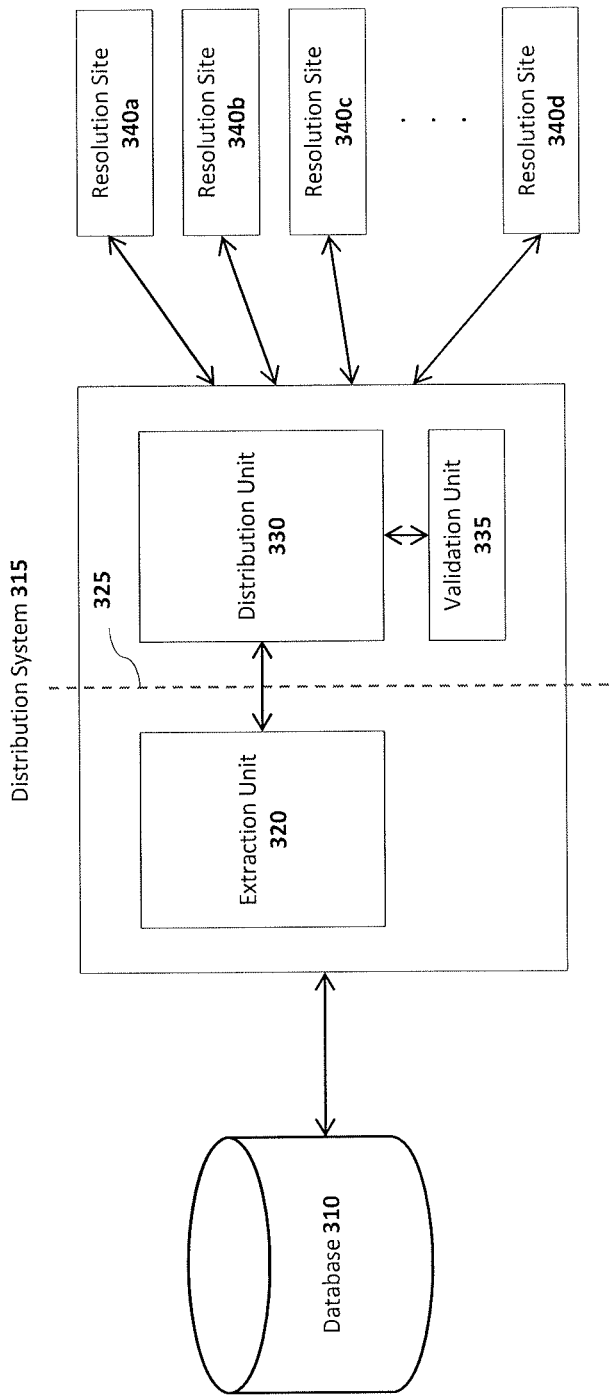
FIG. 3 is a diagram illustrating an exemplary DNS record distribution system capable of implementing disclosed embodiments, including exemplary system components.

FIG. 3 is a diagram illustrating an exemplary DNS record distribution system capable of implementing disclosed embodiments, including exemplary system components. Database 310 may be substantially similar to databases 150 and 255 of FIGS. 1 and 2, respectively. Database 310 may be hosted in an Oracle database server. Distribution system 315 may include extraction unit 320, firewall 325, distribution unit 330, and validation unit 335. Extraction unit 320 may be responsible for identifying updated DNS records stored in database 310. For example, extraction unit 320 may examine one or more logs generated for database 310 listing operations that were performed on database entries, such as inserts, updates, and deletes. Distribution unit 330 may confirm the validity of the updated DNS records through validation unit 335. Distribution unit 315, as illustrated in FIG. 3, may communicate with resolution sites 340a-d (collectively "resolution sites 340") to distribute updated DNS records. Resolution sites 340 may have one or more databases, such as in-memory databases.

Consistent with disclosed embodiments, extraction unit 320 may check the logs generated for database 310 to identify database entries that need to be modified at the resolution sites 340. Extraction unit 320 may generate a file identifying such database entries and the corresponding changes. For example, the file may include an Oracle user table identifying database entries and the corresponding changes. Furthermore, the changes may be stored using various formats, such as logical change records or sendfile lines.

Consistent with disclosed embodiments, the file identifying database entries and the corresponding changes may then be copied to distribution unit 330 and validation unit 335. The file may be copied in parallel. The file may also cross a firewall 325 in order to reach distribution unit 330 and validation unit 335. Distribution unit 330 may copy the file to the resolution sites 340. The file may again be copied in parallel. Consistent with disclosed embodiments, resolution sites 340 may be configured so as to not load the file until receiving an indication that the file is valid. Consistent with disclosed embodiments, validation unit 335 may load the changes contained in the file and attempt to apply the changes to the databases contained in resolution sites 340. The validation unit may, for example, perform various checks to ensure that the databases contained in resolution sites 340 remain consistent. After attempting to load the file, validation unit 335 may record whether the file is valid or invalid. If the file is determined to be valid, validation unit 335 may generate a new file, such as a control file, indicating that the file is valid. Finally, validation unit 335 may provide the newly-generated file to distribution unit 330, which in turn may copy the newly-generated file to resolution sites 340.

Figure 4:
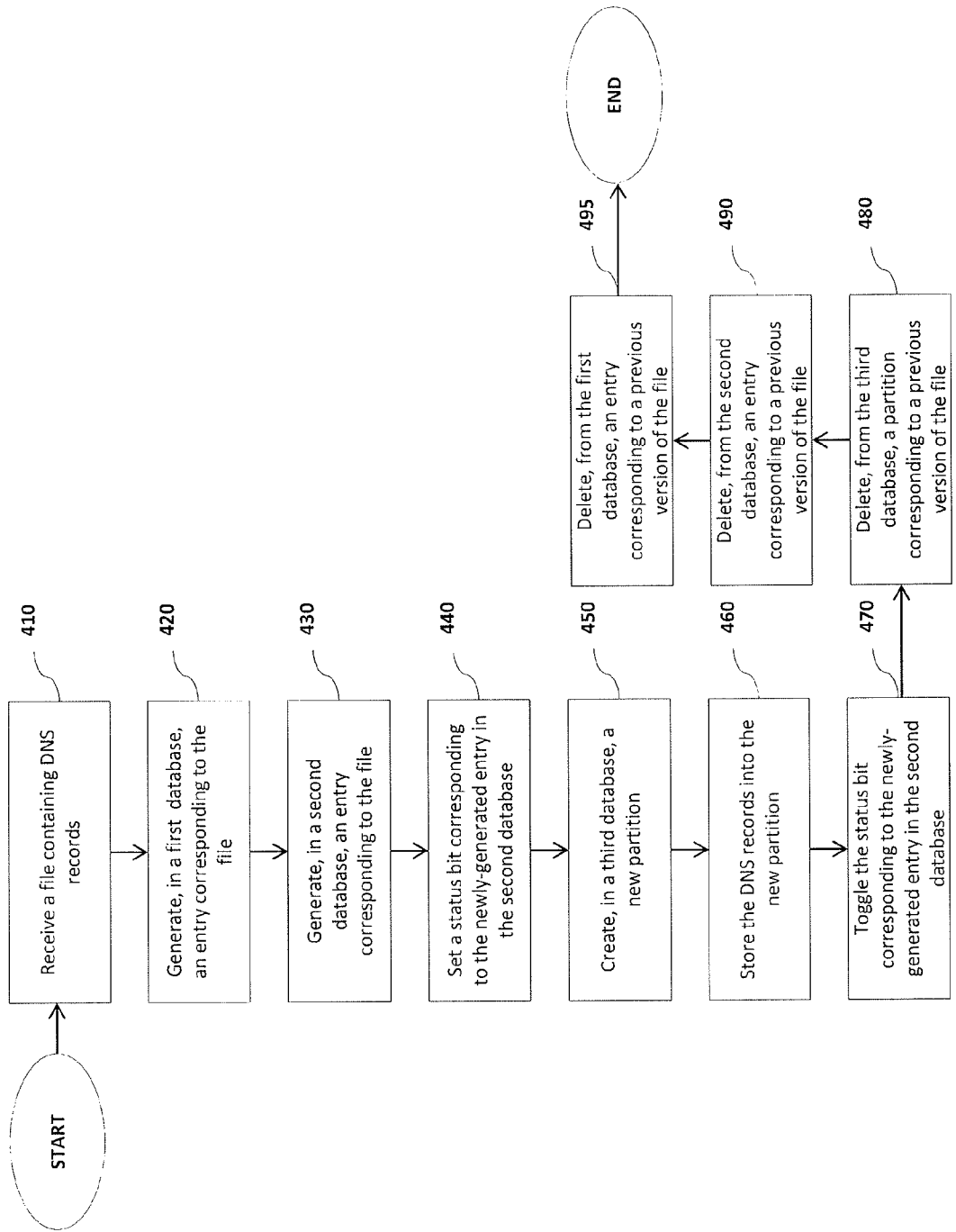
FIG. 4 is a flow diagram illustrating exemplary processes for instantaneously updating a DNS system database containing DNS records by using partitions and atomic switching, consistent with disclosed embodiments.

FIG. 4 is a flow diagram illustrating exemplary processes for instantaneously updating a DNS system database containing DNS records by using partitions and atomic switching, consistent with disclosed embodiments. The use of partitions and atomic switching may improve the performance of a DNS system. In Step 410 of FIG. 4, a file containing DNS records may be received. For example, the file may be a zone file or a file describing a particular zone. As another example, the DNS records may be resource records. An entry in a first database may be generated at Step 420. Each entry in the first database may relate to a particular zone, or a version of a particular zone, and the DNS records associated with the zone. The first entry in the first database may be associated with all of the zones that are not large enough to be partitioned. Consistent with disclosed embodiments, entries in the first database may include a first field including a zone name, a second field including an indication of whether a partition, located in a third database, corresponding to the zone name is in use, and a third field including a description of the partition, located in the third database, corresponding to the zone name. The first database may be referred to as a "Resource Records Partition Table."

An entry in a second database may be generated at Step 430. Each entry in the second database may relate to a particular zone or a version of a particular zone. Consistent with disclosed embodiments, entries in the second database may include a first field including a zone name, and a second field including a status bit or "flag" indicating whether a partition, located in a third database, corresponding to the zone name is active or not. For example, the status bit may be set to "0" or "N" in order to indicate that the partition corresponding to the zone name is not active, and it may be set to "1" or "Y" to indicate that the partition corresponding to the zone name is active. Consistent with disclosed embodiments, a pre-existing entry in the second database may correspond to another version of the zone name associated with the newly generated entry. The status bit of the pre-existing entry may be set to "1," indicating that the partition corresponding to that version of the zone name is active. The second database may be referred to as a "Zone Table."

At Step 440, the status bit field corresponding to the newly-generated entry in the second database may be set to "0." At Step 450, a new partition may be created in the third database. Consistent with disclosed embodiments, the new partition may be associated with the newly generated entries in the first and second databases, respectively. For example, the newly generated entry in the first database may include a description (e.g., identifying the location) of the new partition. Similarly, the newly generated entry in the second database may include a status bit field set to "0," indicating that the new partition is not yet active.

At Step 460, the DNS records received at Step 410 may be stored in the new partition created at Step 450. Consistent with disclosed embodiments, the DNS records may be stored in the new partition in units of one or batches of DNS records. The batches may vary in size; for example, one possible batch size may be 100,000 DNS records. Also consistent with disclosed embodiments, the DNS records, including batches of DNS records, that have been stored in the new partition may be transferred to DNS resolution sites. DNS resolution sites may include one or more servers or server systems, and may be physically located all over the world. At Step 470, the status bit field corresponding to the newly-generated entry in the second database may be toggled to "1," indicating that the new partition has become active. Consistent with disclosed embodiments, the status bit field of a pre-existing entry in the second database corresponding to another version of the zone name associated with the newly generated entry may be set to "0," indicating that the partition corresponding to that version of the zone name is no longer active.

Consistent with disclosed embodiments, a partition corresponding to a previous version of the file may be deleted at Step 480. The partition may correspond to, for example, an inactive version of the file, and may therefore contain outdated DNS records. Similarly, at Step 490, an entry in the second database corresponding to a previous version of the file may be deleted. The entry may correspond to an inactive version of the file. At Step 495, an entry in the first database corresponding to a previous version of the file may also be deleted. Similarly, the entry may correspond to an inactive version of the file. Consistent with disclosed embodiments, the respective deletions described above may occur in any order, including deletions occurring in parallel, and are not limited to the order as depicted in FIG. 4.

Figure 5:
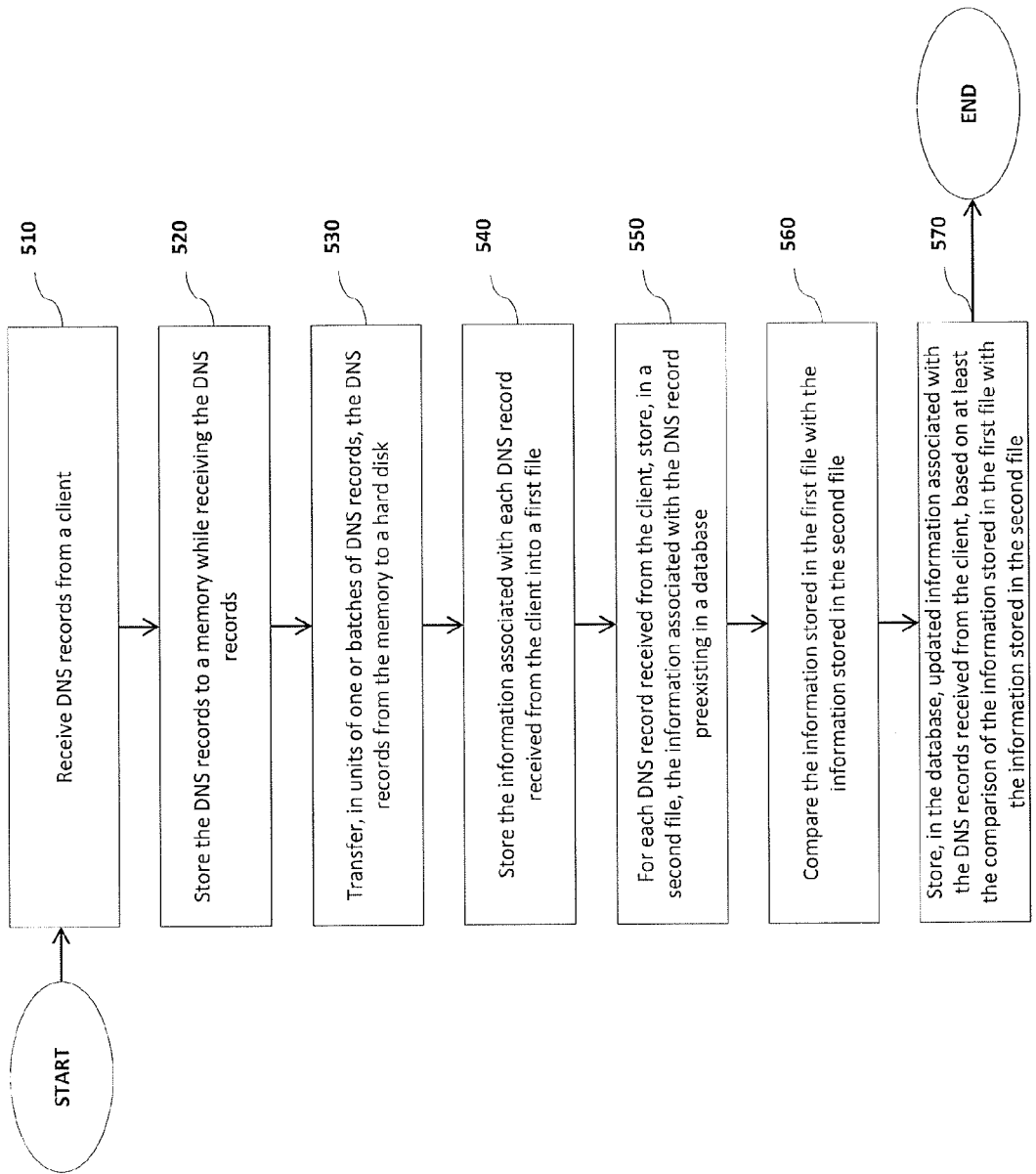
FIG. 5 is a flow diagram illustrating exemplary processes for storing records received from a client to a hard disk and simultaneously saving the records into a database in batches, consistent with disclosed embodiments.

FIG. 5 is a flow diagram illustrating exemplary processes for storing records received from a client to a hard disk and simultaneously saving the records into a database in batches, consistent with disclosed embodiments. In Step 510 of FIG. 5, a DNS records may be received from a client. A client may include one or more general purpose computers, servers, or any devices capable of communicating over a network. At Step 520, the DNS records may be stored in a memory while continuing to receive DNS records from the client. The DNS records may then be transferred from the memory to a hard disk at Step 530. Consistent with disclosed embodiments, the DNS records may be transferred in units of one or batches. The batches may vary in size; for example, one possible batch size may be 100,000 DNS records.

At Step 540 of FIG. 5, information associated with each DNS record received from the client may be stored into a first file. Consistent with disclosed embodiments, the first file may be located on the hard disk, and the file may be written in a way to facilitate copying of the information associated with each DNS record into a database. Additional DNS records received from the client may continue to be stored into the first file. At Step 550, for each DNS record received from the client, information associated with the DNS record preexisting in a database may be stored into a second file. The second file may be written simultaneously while receiving additional DNS records from the client. Consistent with disclosed embodiments, the second file may be located on the hard disk, and the file may be written in a manner similar to the format of the first file. At Step 560, information stored in the first file may be compared with information stored in the second file.

Consistent with disclosed embodiments, the first file may contain updated DNS records for a particular zone, and the second file may contain the preexisting (non-updated) DNS records for the same zone. Comparing the DNS records stored in the two files may, therefore, highlight those DNS records that have been updated. At Step 570, based on the comparison, updated information associated with the DNS records received from the client may be stored in the database. Storing only the updated information into the database, rather than storing all of the DNS record information received from the client, may result in time savings and greater efficiency. Consistent with disclosed embodiments, the updated information may be stored in units of one or batches, in accordance with the exemplary methods described in connection with FIG. 4, above. The batches may vary in size; for example, one possible batch size may be 100,000 DNS records.

Figure 6:
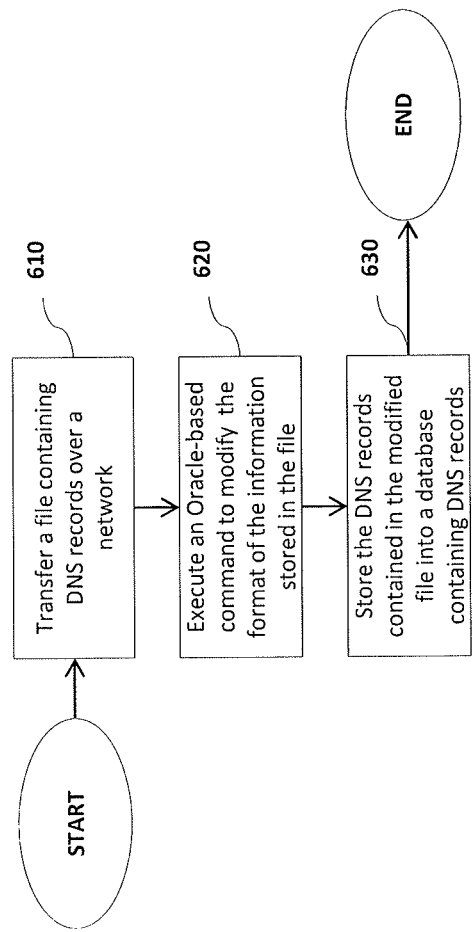
FIG. 6 is a flow diagram illustrating exemplary processes for facilitating batch copying of DNS records received from a client to a database through the use of Oracle code, for example, consistent with disclosed embodiments.

FIG. 6 is a flow diagram illustrating exemplary processes for facilitating batch copying of DNS records received from a client to a database through the use of Oracle code, for example, consistent with disclosed embodiments. At Step 610 of FIG. 6, a file containing DNS records may be transferred over a network. For example, one or more database servers may be communicatively connected to the network. The network may also use an Oracle-compatible file system. Consistent with disclosed embodiments, the file may be an Oracle file type. At Step 620, the file may be modified by executing an Oracle-based command. For example, an Oracle-based command may modify the format of the information stored in the file. The DNS records contained in the modified file may be stored into a database containing DNS records at Step 630. Consistent with disclosed embodiments, the DNS records may be stored in the database in response to a command issued through an Oracle server over the network. Using the exemplary methods described in connection with FIG. 6 may result in greater efficiency because a large number of DNS records may be stored in a single transaction, obviating the need to perform a large number of individual store transactions for the individual DNS records. Of course, exemplary processes for facilitating batch copying of DNS records may be implemented using other object-relational database management systems and associated code.

FIG. 7 is a flow diagram illustrating exemplary processes for using a transparent proxy that filters DNS-related web traffic received by the DNS system, consistent with disclosed embodiments. DNS-related web traffic may be received at Step 710. Consistent with disclosed embodiments, DNS-related web traffic may include one or more network packets. For example, network packet types may include User Datagram Protocol ("UDP") packets and Transmission Control Protocol ("TCP") packets. At Step 720, the received traffic may be filtered, based on, for example, a configured IP address list. Consistent with disclosed embodiments, the IP address list may be user-configured to specify name servers or host names authorized to communicate with a DNS system, such as the exemplary DNS systems described in connection with FIGS. 1 and 2. For example, web traffic with a source IP address that does not correspond to a legitimate host may be blocked. Consistent with disclosed embodiments, the received traffic may be filtered based on, for example, an examination of the application layer communications. Received traffic that do not conform to a particular protocol, such as the DNS protocol, for example, may be blocked. A destination to forward the filtered traffic may be determined at Step 730. For example, the destination may be a zone relay, such as the zone relay 135 described in connection with FIG. 1. Consistent with disclosed embodiments, the destination relay may be determined based on status checks of the destination relays and/or the use of a round robin decision scheme.

Next, the information contained in the filtered traffic may be encoded at Step 740. Consistent with disclosed embodiments, encoding may include rewriting the fields of a network packet. For example, the headers of a UDP packet may be rewritten so that the destination address is the destination relay determined at Step 730, the source address is a proxy, such as DDOS protection proxy 125 described in connection with FIG. 1, and the client IP address is appended at the end of the packet, thereby increasing the packet's length. The filtered traffic may then be forwarded to the destination relay at Step 750. Forwarding the filtered traffic to the destination relay may cause it to cross through a firewall, such as firewall 130 described in connection with FIG. 1. At Step 760, the information in the filtered traffic may be decoded. Consistent with disclosed embodiments, decoding may include performing the inverse of the encoding method. Additional processing may be performed on the filtered traffic at Step 770. The processing may occur within the Linux kernel. Using the exemplary methods described in connection with FIG. 7 may offer greater protection against DDOS attacks through the use of a user-configured IP address list and the removal of public IP addresses from filtered traffic that has been forwarded to a destination relay.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with software. For example, program sections or program modules can be designed in or by means of .Net Framework, .Net Compact Framework (and related languages, such as Visual Basic, C, etc.), Python, PHP, XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A system for updating a DNS system database, comprising:
   a processor; and
   a memory having instructions that, when executed by the processor, cause the processor to perform the operations of:
   receiving a file containing DNS records, wherein the file comprises DNS resource records;
   generating, in a resource records partition table, an entry corresponding to the file, wherein the resource records partition table comprises a first field comprising a zone name and a second field comprising an indication of whether a partition corresponding to the zone name, located in a third database, is in use;
   generating, in a zone table, an entry corresponding to the file;
   setting a status bit corresponding to the newly-generated entry in the zone table;
   creating, in the third database containing partitions, a new partition;
   storing the DNS records into the new partition; and
   toggling the status bit corresponding to the newly-generated entry in the zone table.

2. The system of claim 1, wherein the file comprises a zone file containing resource records.

3. The system of claim 1, wherein the resource records partition table comprises a third field including a description of the partition corresponding to the zone name.

4. The system of claim 1, wherein the operation of storing the DNS records into the new partition further comprises:
   storing DNS records into the new partition in one or more batches of DNS records; and
   transferring each batch to one or more DNS resolution sites.

5. The system of claim 4, wherein each batch comprises at least 100,000 DNS records.

6. The system of claim 1, wherein the operation of toggling the status bit corresponding to the newly-generated entry in the zone table further comprises:
   toggling the status bit of a preexisting entry in the zone table associated with a different version of the file; and
   deleting the partition, located in the third database, corresponding to the preexisting entry in the zone table.

7. The system of claim 6, wherein the operation of deleting the partition, located in the third database, corresponding to the preexisting entry in the zone table further comprises:
   deleting, from the zone table, an entry corresponding to a previous version of the file; and
   deleting, from the resource records partition table, an entry corresponding to a previous version of the file.

* * * * *